United States Patent [19]

Obear

[11] 4,052,822
[45] Oct. 11, 1977

[54] METHOD AND APPARATUS FOR ABRASIVELY CUTTING OBJECTS

[75] Inventor: Robert F. Obear, Rolling Hills Estates, Calif.

[73] Assignee: Western Gear Corporation, Everett, Wash.

[21] Appl. No.: 667,107

[22] Filed: Mar. 15, 1976

[51] Int. Cl.² .................. B24B 27/04; B24B 1/02; B24B 27/06; B23B 5/14

[52] U.S. Cl. ........................................ 51/88; 51/99; 51/105 R; 51/281 R; 51/327; 82/47; 82/98

[58] Field of Search ............... 51/40, 42, 47, 88, 89, 51/80 R, 84, 99, 105 R, 281 R, 290, 327; 125/13; 83/512; 82/47, 86, 98

[56] References Cited

U.S. PATENT DOCUMENTS

| | | | |
|---|---|---|---|
| 2,165,118 | 7/1939 | White | 51/327 |
| 3,656,261 | 4/1972 | Everett | 51/99 |
| 3,768,350 | 10/1973 | Coulter | 51/40 |

*Primary Examiner*—James L. Jones, Jr.
*Assistant Examiner*—Nicholas P. Godici
*Attorney, Agent, or Firm*—Seed, Berry, Vernon & Baynham

[57] ABSTRACT

A unique method and apparatus for making a score cut on a metal object with a previously used abrasive cutting wheel, worn down from a new, larger diameter wheel to allow use of worn cutting wheels and to improve the ratio of cross-sectional area of metal material cut to cross-sectional area of wheel used. Another feature is the use of a hydraulic bearing for reducing friction between the object rotating chuck stands and the track on which the stands are moved by simultaneously flushing the abrasive particles from the track. In one embodiment, the flushing material is recycled to replenish the coolant reservoir fluid loss through evaporation.

20 Claims, 10 Drawing Figures

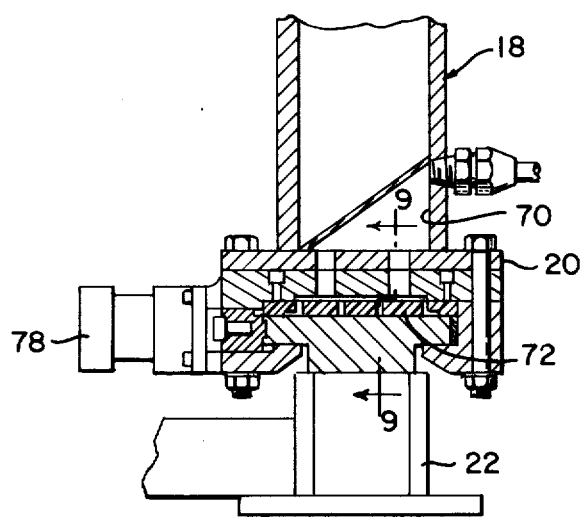
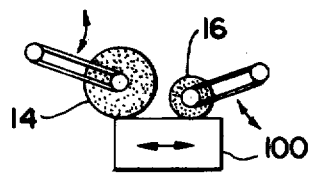
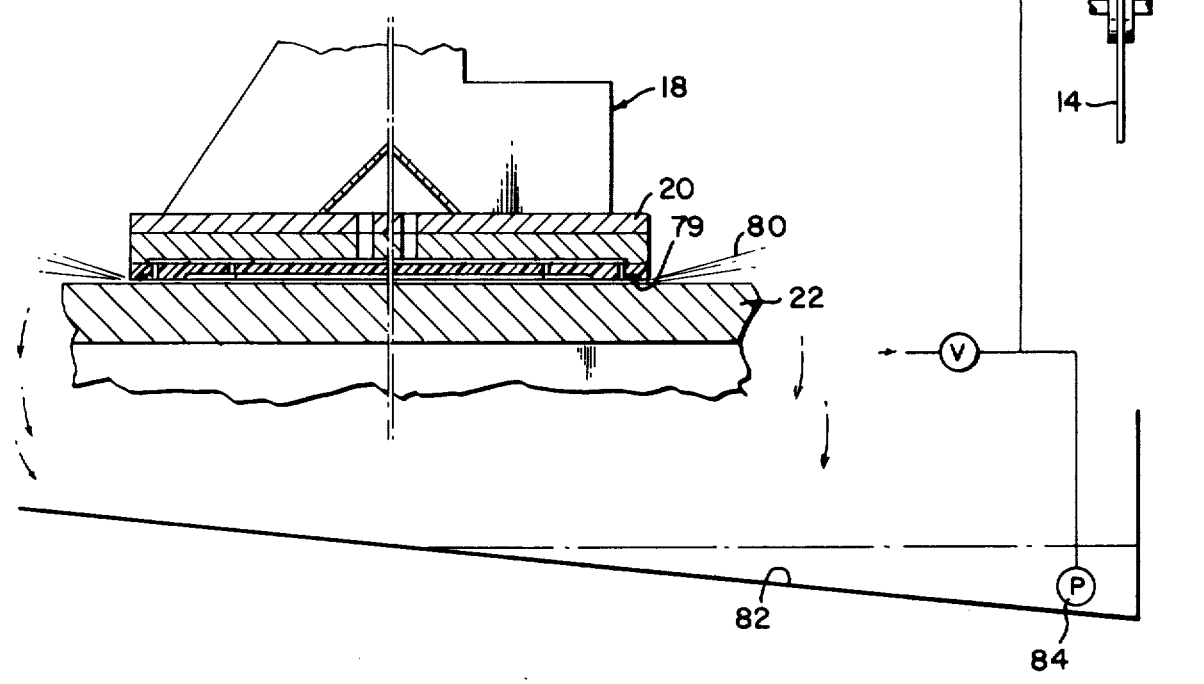

METHOD AND APPARATUS FOR ABRASIVELY CUTTING OBJECTS

BACKGROUND OF THE INVENTION

1. Field of the Invention

This invention pertains to abrasive cutting saws of the type used for cutting plates and, particularly, for elongated metal objects such as billets and ingots which can be rotated while being cut. The invention also pertains to a technique for improving the movability and wear life of chuck stands for positioning billets in an abrasive cutting machine.

2. Description of the Prior Art

Abrasive cutting saws have been highly successful for cutting metal objects such as steel plates, steel or alloy billets, bars and the like. Heretofore, the object was cut with a standard size abrasive wheel starting with a 48 inch diameter, for example, and was worn down to approximately 26 to 30 inches and then had to be discarded. In addition, scoring of the object to make the initial cuts was difficult since the inherent flexibility of the large diameter wheel tended to make the cutting surface of the wheel skid on the surface sometimes breaking the wheel and always requiring a long time-consuming operation to make the initial scoring cut. In addition, the initial point contact between the large wheel and the outer surface of the object was essentially a dressing cut which substantially reduced the cutting life of the wheel. Some attempts to eliminate the skipping of the large diameter wheel resulted in the use of reinforced, rigid wheels costing considerably more money than an unreinforced abrasive wheel.

Heretofore, abrasive cutting machines have used a constant feed rate for moving the abrasive cutting wheel into the work. This was coupled with a high rotational rate, for example 15 rpm, for the object being cut. Since the abrasive wheel is constantly wearing and thus decreasing in diameter, the fixed feed, high rotational rate of the object and the constant wearing of the wheel resulted in small cutting depths for each revolution of the object producing a dressing cut on the wheel thus reducing its longevity.

Still another problem in prior art abrasive cutting machines is that the abrasive environment for the chuck stands which carried and rotated the object being cut caused the stands to bind as they were moved along a track increasing maintenance costs and increasing downtime to repair the stands or the track.

SUMMARY OF THE INVENTION

It is an object of this invention to provide method and apparatus for increasing the cutting rate of abrasive cutting wheels.

It is another object of this invention to provide method and apparatus for utilizing worn cutting wheels in an efficient manner.

It is another object of this invention to provide method and apparatus for reducing the wear per object cut of abrasive cutting wheels.

It is still another object of this invention to provide method and apparatus for cutting irregularly shaped metal objects of larger diameter than heretofore.

It is another object of this invention to provide method and apparatus for obtaining a spiral cut action for an abrasive cutting wheel which minimizes wheel wear when cutting rotated metal objects.

It is still another object of this invention to provide method and apparatus for improving the longevity of chuck stand tracks.

It is still another object of this invention to provide method and apparatus for efficiently utilizing the flushing water from a hydraulic bearing between a movable chuck stand and a track.

Basically, these objects are best achieved in the broadest aspect by moving a small, used, rigid rotating cutting wheel formed from a new, larger cutting wheel into engagement with the object to provide a scoring cut, next moving a larger rotating wheel of the type from which the smaller wheel is formed by wear into engagement with the object within the scoring cut. The more rigid periphery of the used wheel enables a faster and more accurate scoring cut, the larger wheel cuts over a larger surface of its periphery to increase its cutting life and cutting rate. In the preferred embodiment, the smaller wheel can be used for a percentage of the cut simultaneously with the larger wheel to again reduce cutting time. When cutting objects which are rotated, the smaller cutting wheel is advantageously pivoted into the object from a lower quadrant of the object diametrically opposed to the upper quadrant which the larger cutting wheel is acting to allow simultaneous cutting witout interference between the cutting wheels.

In the preferred embodiment, the cutting wheel is fed using a constant force which, when used in conjunction with a rotated object, allows the cutting wheel to make an increasingly deeper cut with increased penetration along the radius of the object being cut so that the cutting rate is increased and dressing of the cutting wheel is decreased. The result is a unique spiral cutting action. The spiral cutting action is achieved through the constant force on the cutting wheel as well as a low rotational rate of the object below 4 rpm.

Still further, in the preferred embodiment, the constant force feed and slow rotational rate of the object allows tracking of the wheels over irregular peripheral surfaces thus enabling cutting of larger diameter objects with the same diameter large cutting wheels which were heretofore limited to cutting irregularly shaped objects only if the distance between the center of the object and its furthest dimension from the center, such as a corner, was less than the usable radius of the large cutting wheel. The slow rotational rate of the object also enables the smaller wheel to make a scoring cut using a climb cut that is, rotating in the opposite direction as the rotational direction of the object.

The advantages of the method and apparatus are readily apparent. Since the smaller, used wheel now has found a useful life, the number of replacement wheels is reduced. The wearing life of the new larger wheels is substantially increased and breakage due to skipping or skidding where the larger wheel was formally used for scoring is substantially reduced. In addition, non-reinforced less-expensive wheels are still usable. The unique invention provides a substantial increase in wheel wear ration (M/W). Total metal object area removed over wheel area is also substantially increased. The number of cuts per wheel is substantially increased. The time required per cut is substantially reduced whereas the cutting rate in inches per minute is increased substantially. In addition, since a non-reinforced cutting wheel can be employed, the cutting wheel will be of a smaller thickness than a reinforced wheel allowing a thinner kerf to be made in the object thus providing a savings by reducing the amount of material to be cut. In one example considered, it is found that the cutting can be achieved 40 times faster than prior art abrasive saws with longer wheel life and greater capacity for larger objects being rotated.

In the feature of improving the chuck track longevity, this object is best obtained by flushing the track using the hydraulic bearing fluid for supporting the chuck stand while moving on the track. In the preferred embodiment, the flushing water is then collected and delivered to the cooling reservoir for the abrasive saws to replenish that fluid lost by evaporation.

BRIEF DESCRIPTION OF THE FIGURES OF THE DRAWINGS

FIG. 8 is a fragmentary vertical section taken through one of the chuck stands shown in FIG. 1.

FIG. 9 is a fragmentary section taken along the line 9—9 of FIG. 8 and showing a functional schematic diagram for using water to clean abrasives from the track on which the stands rest and recycling the water.

FIG. 10 is a schematic illustration of another embodiment.

DETAILED DESCRIPTION OF THE PREFERRED EMBODIMENTS

Figure 1:
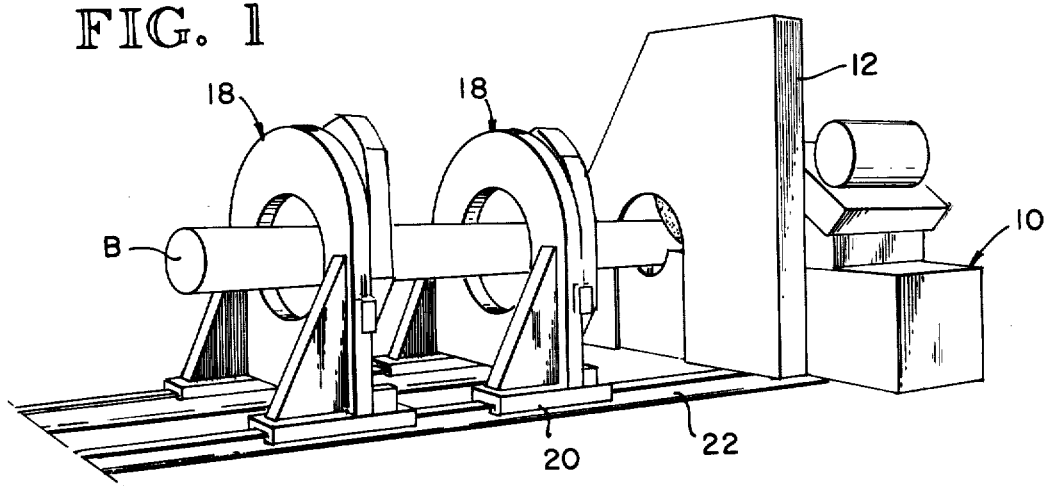
FIG. 1 is a perspective illustration of an abrasive cutting machine embodying the principles of the invention and suitable for practicing the method of the invention.

As best illustrated in FIG. 1, the abrasive sawing machine includes a main frame 10 having a saw housing 12 which positions a large saw or cutting wheel 14 and a smaller saw or cutting wheel 16 for engagement with a metal object to be cut, such as a billet B. As is well known in the art, the billet B is rotated while being supported in a pair of chucks 18, each of which includes a movable chuck stand 20 that is slidably mounted on a pair of tracks 22.

Figure 2:
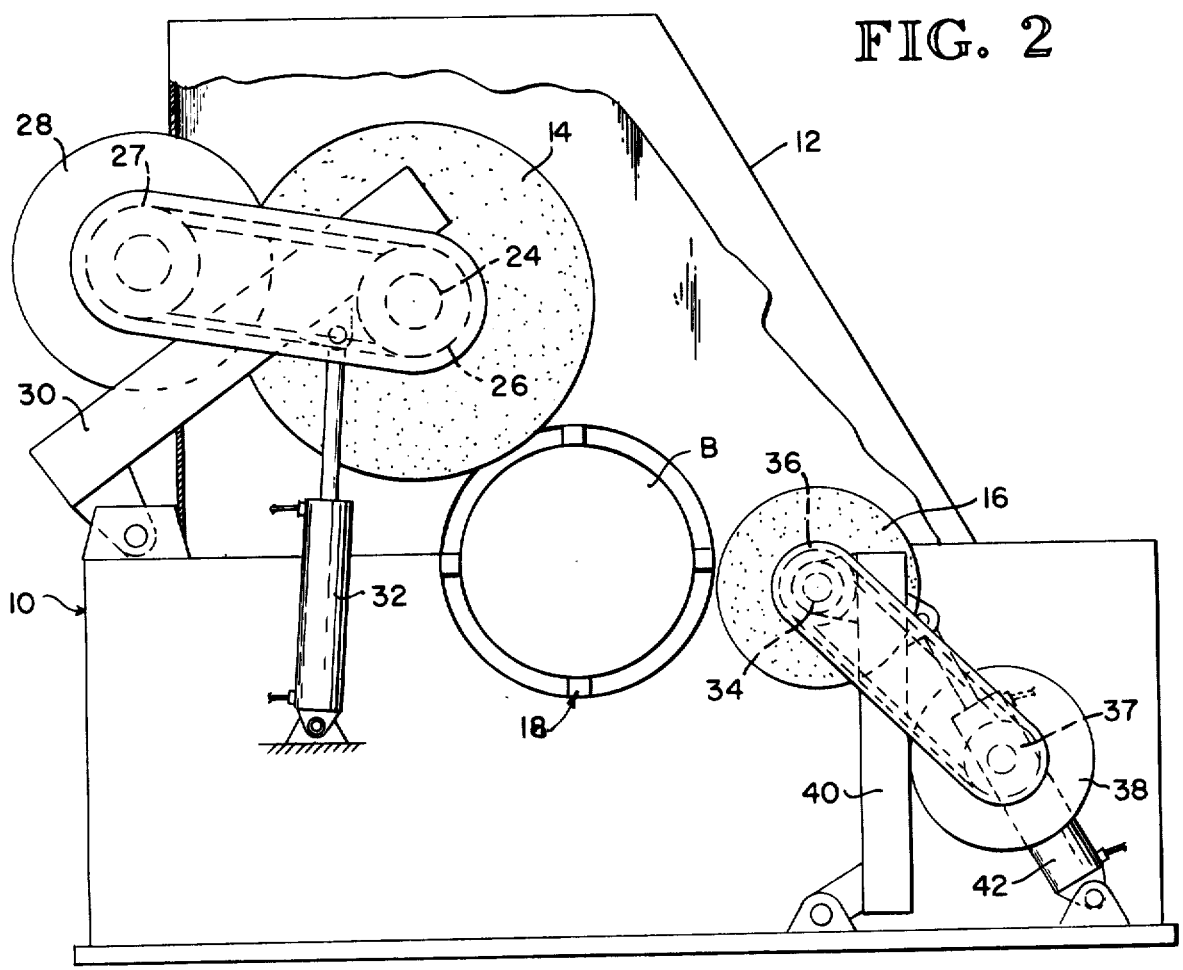
FIG. 2 is a fragmentary side elevation of a portion of the machine shown in FIG. 1 illustrating the rotary abrasive cutting wheels.
Figure 7:
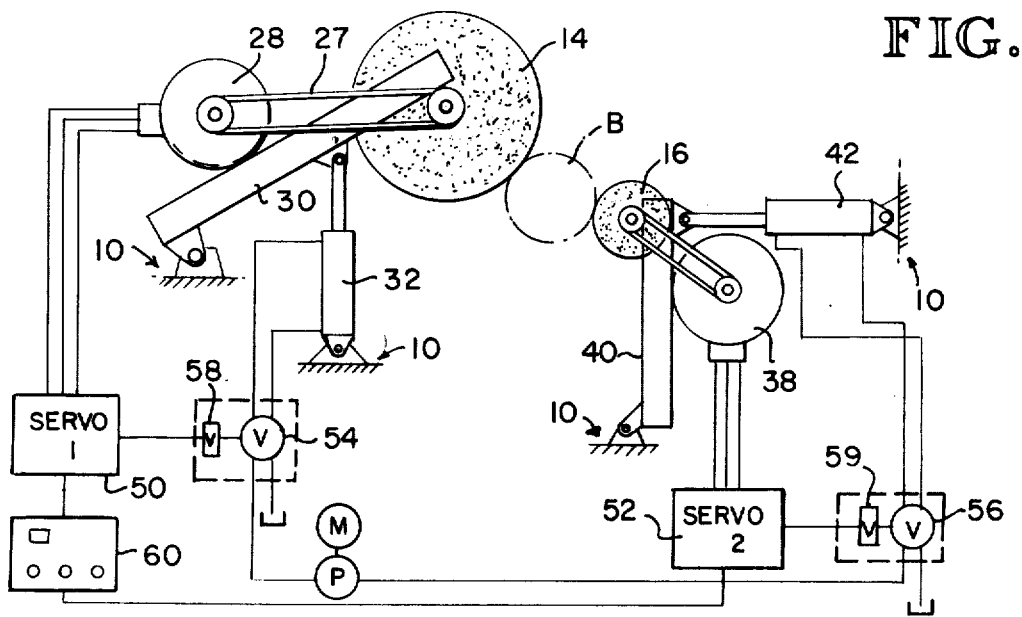
FIG. 7 is a schematic operational diagram for the machine shown in FIG. 1.

As best illustrated in FIGS. 1, 2 and 7, it is a feature of this invention that two cutting wheels having a unique relationship with one another are provided for cutting the billet B. The larger cutting wheel 14 is preferably a non-reinforced abrasive disc or wheel of a conventional type such as manufactured by Avery Abrasives under the Trade name AVERY, having a diameter of, for example, 48 inches and of a uniform thickness throughout. The wheel is mounted on an arbor 24 which is connected to a shaft and sheave 26 that is driven by a belt drive 27. The belt drive 15 powered by a suitable electric motor 28 of 200 horsepower, for example. In the preferred embodiment, this motor will provide a spindle or shaft speed for the large cutting wheel 14 of about 700 rpm giving the peripheral surface of the wheel a nominal peripheral surface speed of about 8500 sfm. The shaft mounting the arbor 24 is rotatably secured to a pivot arm 30 which is pivoted by a hydraulic cylinder 32 to pivot the wheel 14 into the upper left-hand guadrant of the billet B.

It is a unique feature of this invention that the smaller wheel 16 is preferably a used wheel formed by wearing on the original large wheel 14. The large wheel, when worn from its 48 inches in diameter to approximately 26 to 30 inches in diameter, becomes less efficient for cutting and is limited in the size of billets which it can effectively cut. In this invention this used wheel is then employed as the smaller cutting wheel 16 for making an initial scoring cut. It is apparent, of course, while the advantages of the invention are best achieved by utilizing what was formally a discarded used cutting wheel, that the features of the invention can also be practiced by using newly manufactured smaller wheels, especially if not enough used wheels are available in inventory. The smaller wheel is also provided with an arbor 34 which is secured to a shaft or spindle and sheave 36 which is driven by a belt drive 37. A suitable motor, such as a 100 horsepower electric motor 38 is provided to drive the spindle at a speed of about 1200 rpm to provide a peripheral surface speed on the smaller wheel 16 also of about 8500 sfm. The surface speeds are the standard surface speeds preferred for efficient and long-life cutting of this type of non-reinforced abrasive cutting wheel. The shaft for the wheel 16 is also rotatably secured to a pivot arm 40 that is pivoted by a hydraulic cylinder 42 to swing the wheel 16 generally into a lower quadrant of the billet generally diametrically opposite to the larger wheel 14. The position of the wheels, when in engagement with the billet, provides maximum clearance between the wheels as they begin to approach one another while simultaneously cutting in the billet.

As best shown in FIG. 7, each of the hydraulic cylinders 32 and 42 are powered under the control of a servo mechanism 50 and 52, respectively. The servo mechanisms each sense the load acting on the respective motors 28 and 38 and in response to changes in the loading, control the position of valves 54 and 56, respectively, to maintain a constant force on the cutting discs. A suitable servo control system for this purpose is illustrated and described in U.S. patent application Ser. No. 611,098, filed Sept. 8, 1975, which description and illustrations are specifically incorporated herein by reference thereto. Enabling valves 58 and 59 are provided, in the preferred embodiment, to effectively lock the cutting wheels in a fixed position in the case of malfunctions or necessary shutdowns in the machines. The servo mechanism 50 and 52 are also coupled to a control panel 60 which enables an operator to manually select which of the two cutting wheels are in engagement with the billet and the sequence of engagement. The application of a constant force on the wheels advantageously allows the wheels to track around irregular peripheries of billets without imposing excessive stress on the abrasive wheels. It is especially advantageous for cutting square billets since the cutting wheels can track around the square billet providing a generally square series of radially spaced cutting bands in the form of spiral with each radially inward band being substantially thicker along the radius than the next succeeding outwardly spaced band.

Figure 4:
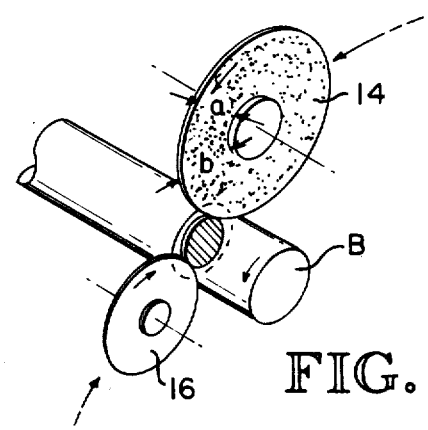
FIG. 4 illustrates a larger cutting wheel entering the scoring cut to make a finishing cut.
Figure 5:
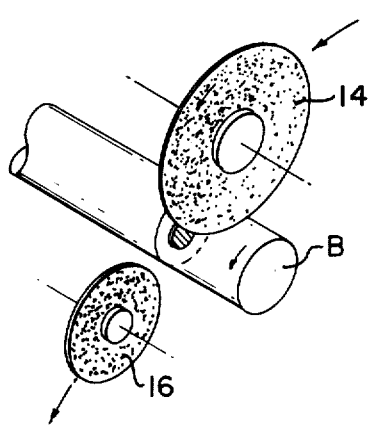
FIG. 5 illustrates the larger cutting wheel nearing completion of its finishing cut.
Figure 6:
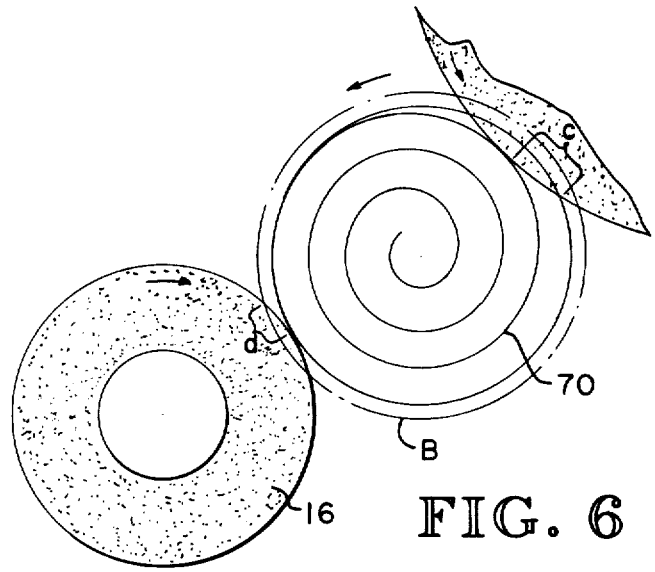
FIG. 6 is an enlarged end view looking directly in at the end of a cut billet showing the spiral-type cut produced in which each radially inward band of the spiral is of an increased width along the radius of the billet to produce a faster cut.

In prior art devices, it is necessary to limit the size of the billet being cut to one having a maximum distance between its center and its radially outwardly furthest point to a size which did not exceed the usable area of the cutting wheel between the peripheral surface of the cutting wheel when worn down and the arbor of the cutting wheel or it is necessary to stop the billet and make time consuming adjustments and then alternate cuts billet rotations to cut in from the flats. The maximum usable distance is indicated by the dimension b, for example, in FIG. 4 and is the maximum size that could be used in prior art cutting machines unless the machine was stopped and a new wheel was placed on the machine for the final cuts. Even in this case, the maximum dimension would be equal to the distance $a$, in FIG. 4 allowing for some wear for making the final cuts.

By allowing the wheels to track as in this invention, the cuts are made continuously around the billet at a generally uniform distance in from the outer periphery of the billet until, for example with a square billet, the square pattern of the cut is brought in toward the center of the billet and the cut passes through the center to cut off the end of the billet. At the time of cut, however, the arbor of the cutting disc will be at one of the radially innermost surfaces of the billet and not out at a furthermost corner so that the distance between the worn peripheral cutting surface of the wheel and its arbor will be less than the furthest distance between the center of the billet and its outermost corner, thus allowing larger billets to be cut.

The unique method of the machine is best illustrated in FIGS. 3–6.

The billet is preferably rotated in the chucks at a rotational speed which does not exceed about 4 rpm. This slow, rotational speed enables the cutting wheels 14 and 16 to make their constant force tracking around the center of the billet and provides the most efficient wheel wear ratio, that is, the ratio of the cross-sectional area of the material cut to the cross-sectional area of the wheel used up during the cut. This occurs because the larger cutting wheel, especially, is able to provide, effectively, plunge cutting distribution the forces at the peripheral surface of the cutting wheel over a large cutting area, thus minimizing dressing of the peripheral surface of the cutting wheel. The constant force acting on the cutting wheel 14 enables the wheel to cut the progressively increasing spiral-type band 70 shown in FIG. 6. This spiral cut is a result of many factors including the decreasing circumferential uncut surface on the billet after each revolution and the decreasing circumferential surface of the cutting wheel 14.

Figure 3:
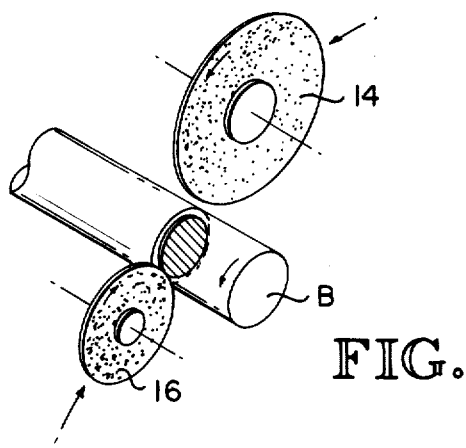
FIG. 3 is a schematic functional isometric showing a first step in an operational sequence in which one cutting wheel scores a billet.

As best shown in FIG. 3, the smaller, used cutting wheel, while still of the same thickness as the larger cutting wheel (0.300 inch, for example), is much more rigid and thus does not skid along the surface of the billet during the initial scoring cut. Since less concern is had with the wearing life of this used cutting wheel, it is rotated in a direction the opposite as that of the billet to provide the preferred climb-cutting for accurate alignment of the scoring cut while recognizing that a dressing-type wear will be occurring. Once the scoring cut is made to about three-quarters of an inch, for example, within the periphery of the billet regardless of its irregulatities, the larger cutting wheel is moved into engagement with the billet within the scoring cut previously made. At this point, the larger wheel can continue cutting while removing the smaller wheel but in the preferred embodiment, both wheels cut simultaneously for another few inches to supplement the cutting speed. Finally, the smaller wheel is removed and the final cut is made through the billet from above so that the billet cut end can be removed freely without binding the wheel. The larger wheel 14 is rotated in a direction similar to that of the billet which is the preferred direction for maximum wearing life of the wheel. Due to the slow rotational speed of the billet, the larger wheel is able to penetrate rapidly from its initial dressing contact with the peripheral surface of the inside of the scoring cut and move deeply into its optimum surface contact with the billet which surface contact is indicated by the bracket c. Similarly, the smaller wheel, also because of the slow rotational speed of the billet, is able to maximize its wearing surface in contact with the billet as indicated by the bracket d.

Another unique feature of the invention is illustrated in FIGS. 8 and 9. As best shown in FIGS. 8 and 9, the movable chuck stands 20 are each provided with a pressurized water inlet 70 which distributes water down through a perforated nylatron bearing plate 72. The water provides a cushion between the surface of the track 22 and the undersurface of the bearing plate 72 to reduce friction as the chuck are moved along the track. Suitable hydraulic clamps 78 are provided to lock the chucks in place on the track after movement. As best shown in FIG. 9, this water is uniquely permitted to flow thrugh discharge ports 79 providing a forceful stream of water 80 out each of the bearing plate 72 along the track. This filtered water flowing from the stand flushes the highly-abrasive particles from the track preventing binding and increasing the useful life the track.

It is still another unique feature that the water flushing from the track flows through a trough 82 where it is lifted by a pump 84 to the saw coolant spray nozzles 86. In this manner, the now abrasive laden water can be used with the coolant water to replenish the supply of coolant water lost from evaporation thus providing a substantial savings in water consumption.

FIG. 10 illustrates an embodiment in which the object 100 is flat and is reciprocated along a line co-planar with the planes of the cutting wheels 14 and 16. In all other details this embodiment performs essentially as in the preferred embodiment.

While the preferred embodiments of the invention have been illustrated and described, it should be understood that variations will be apparent to one skilled in the art without departing from the principles described herein. Accordingly, the invention is not to be limited to the specific embodiment illustrated.

The embodiments of the invention in which a particular property or privilege is claimed are defined as follows:

1. The method of abrasively cutting elongated metal objects, comprising:
   rotating the object about its longitudinal axis,
   moving a used, small, rigid abrasive cutting wheel, worn from a larger cutting wheel, into engagement with the object in a direction parallel to the plane of the cutting wheel to make a scoring cut around the object,
   moving a larger diameter, more flexible cutting wheel of the type from which the smaller wheel was formed into engagement with the object also in a direction parallel to the plane of the larger cutting wheel and into the scoring cut formed by the smaller cutting wheel, rotating the larger cutting wheel at one angular velocity and rotating the smaller cutting wheel at a generally higher angular velocity to produce peripheral surface speeds at the cutting surfaces of the two cutting wheels which are the preferred speeds for the respective size abrasive wheels, and limiting the rotational speed of the object to below 4 rpm so that a deep spiral band cut is produced by the cutting wheels.

2. The method of claim 1 wherein said object has an irregularly shaped peripheral surface and including the step of moving the two cutting wheels radially of the object with a constant force but at a feed rate variable in response to the radial position of the irregularities of the surface of the object so that the wheels follow the regularities to produce a substantially constant cut around the entire object during each revolution of the object with the cut increasing in depth proportionately with increase inwardly along the radius of the object.

3. The method of claim 1 wherein the peripheral surface speeds of the two wheels are approximately equal.

4. Apparatus for abrasively cutting metal objects, comprising:

means for rotating the object at a slow rate of speed in a first direction, first rotatable abrasive cutting wheel means, second rotatable abrasive cutting wheel means of a diameter larger than said first cutting wheel means but of identical width, means for rotating the wheels, means for moving the cutting wheels into the object at a variable feed rate but with a constant force, and control means for initially moving the first cutting wheel into the object to make a scoring cut and subsequently moving the second wheel into the scoring cut to make a finishing cut.

5. The apparatus of claim 4 wherein said first cutting wheel is pivotally mounted to move into a lower quadrant of the object, and said second cutting wheel is pivotally mounted to move downwardly into an upper quadrant of the object diametrically opposite said lower quadrant.

6. The apparatus of claim 4 wherein said wheel rotating means includes means for rotating said first cutting wheel in the same direction as said object first direction for climb cutting during scoring and means for rotating said larger second cutting wheel in a direction opposite said first direction.

7. The apparatus of claim 5 wherein said wheel rotating means includes means for rotating said first cutting wheel in the same direction as said object first direction for climb cutting during scoring and means for rotating said larger second cutting wheel in a direction opposite said first direction.

8. The method of abrasively cutting elongated metal objects, comprising:

rotating the object about its longitudinal axis in a first direction, first pivoting from one direction a small, used, rigid cutting wheel, formed from a larger cutting wheel, into engagement with the object along a path perpendicular to the object, from below the object and in the plane of the cutting wheel to make a score cut, subsequently pivoting from a generally opposite direction above the object a larger diameter, cutting wheel of a width identical with the smaller wheel, into engagement with the object also in a path perpendicular to the object and in the same plane as the smaller cutting wheel but on the opposite side of the object from the smaller wheel, and rotating the larger cutting wheel in a rotational direction opposite said object rotational first direction and rotating the smaller wheel in a direction the same as said object first direction for climb cutting during the scoring cut.

9. The method of claim 8, including the step of rotating the smaller cutting wheel at an angular velocity which produces a peripheral surface velocity of the smaller cutting wheel approximately equal to the peripheral surface velocity of the larger cutting wheel which surface velocities are preferred for abrasive wheels.

10. The method of abrasively cutting metal objects, comprising:

moving a small, used, rigid rotating cutting wheel, formed from a new larger cutting wheel, into engagement with the object in the plane of the wheel and perpendicular to the surface of the object to produce a scoring cut, moving a larger, rotating cutting wheel of the type from which the smaller wheel is formed by wear into engagement with the object in the same plane and into the scoring cut, whereby the larger wheel is guided by the scoring cut.

11. The method of claim 10, including the step of rotating the larger and smaller wheels at angular velocities which produced preferred peripheral surface speeds.

12. The method of claim 10 wherein the object is elongated, and including the step of rotating the elongated object about its longitudinal axis at a speed of below 4 rpm, and moving the cutting wheels into the object with a constant force.

13. The method of claim 10 wherein the smaller wheel continues to cut while the larger wheel is cutting to supplement the cutting action.

14. The method of claim 12 wherein the smaller wheel continues to cut while the larger wheel is cutting to supplement the cutting action.

15. The method of claim 12 wherein the larger wheel cuts a spiral band which increases in radial thickness around the rotational axis of the object during each revolution of the object and proportional to increases inwardly along the radius of the object.

16. The method of claim 10 wherein the object is flat and the cutting wheels and object are reciprocated relative to each other along a line coplanar with the planes of the cutting wheels.

17. Apparatus for abrasively cutting metal objects, comprising:

means for rotating a small diameter uniform thickness cutting wheel, at a speed preferred for that diameter wheel, means for rotating a larger diameter cutting wheel of the identical uniform thickness at a speed preferred for the larger diameter wheel, means for supporting the object to be cut, means for moving the small diameter wheel into the object to make a scoring cut, means for subsequently moving the larger diameter wheel into engagement with the object in the scoring cut, and means for holding both cutting wheels in engagement with the work for simultaneous supplemental cutting.

18. The apparatus of claim 17 wherein the means for moving the cutting wheels into the work applies a constant force.

19. The apparatus fo claim 18 wherein said means for supporting the object includes means for rotating the object at a speed of below 4 rpm.

20. The apparatus of claim 19, said means for moving said smaller wheel into the object includes a first pivot arm pivotally mounted below the object for movement of the smaller wheel into a lower quadrant of the object, and actuator means for pivoting said pivot arm, and said means for moving the larger cutting wheel into the object includes a second pivot arm pivotally mounted for movement of the larger wheel into an upper quadrant of the object diametrically opposite said lower quadrant, and actuator means for pivoting said second pivot arm.

* * * * *